H. M. RICHARDSON,

Assignor, by mesne assignments, to H. G. PARKER, trustee for said RICHARDSON, G. MCKEE, H. W. WARNER, and J. H. SANDERSON.

CHILD'S CARRIAGE.

No. 10,363. Reissued Aug. 7, 1883.

WITNESSES:

M. Heulver

L. W. Swift

Henry M. Richardson
INVENTOR

By his Attorneys,

W. C. Strawbridge,

Bonsall Taylor.

N. PETERS, Photo-Lithographer, Washington, D. C.

UNITED STATES PATENT OFFICE.

HENRY M. RICHARDSON, OF BOSTON, MASSACHUSETTS, ASSIGNOR, BY MESNE ASSIGNMENTS, TO HORATIO G. PARKER, TRUSTEE FOR SAID RICHARDSON, GEORGE McKEE, HENRY W. WARNER, AND JOHN H. SANDERSON.

CHILD'S CARRIAGE.

SPECIFICATION forming part of Reissued Letters Patent No. 10,363, dated August 7, 1883.

Original No. 143,421, dated October 7, 1873; Reissue No. 6,121, dated November 3, 1874. Application for reissue filed July 2, 1883.

*To all whom it may concern:*

Be it known that I, HENRY M. RICHARDSON, of Boston, in the county of Suffolk and State of Massachusetts, have invented certain new and useful Improvements in Children's Carriages, of which the following is a specification.

This invention relates to that class of carriages having a square or canopy top, and its object is to enable the child to be seen and taken from the carriage by the attendant without leaving the position she must occupy for propelling it by the handle at the back, and, also, to enable the child's face to be protected from the sun or wind when they are in the direction in which the carriage is pushed; and it consists in such an arrangement and construction that the top may be dropped in front of the seat as well as behind it, or fixed in an upright position over the carriage, or inclined at various angles; and, also, in the mechanism by which the same is accomplished, consisting of a pair of rigid arms secured rigidly to the carriage-top and jointed to recessed arcs attached to the body, the arms being provided with spring-bolts or their equivalent, which engage with the recesses on the said arcs to retain the top in the desired position.

Heretofore canopy-tops of children's carriages have been made to drop back, like the ordinary top and rest, in a vertical or inclined position behind the seat, but have not, to my knowledge, been made to drop in front.

Figure 1:
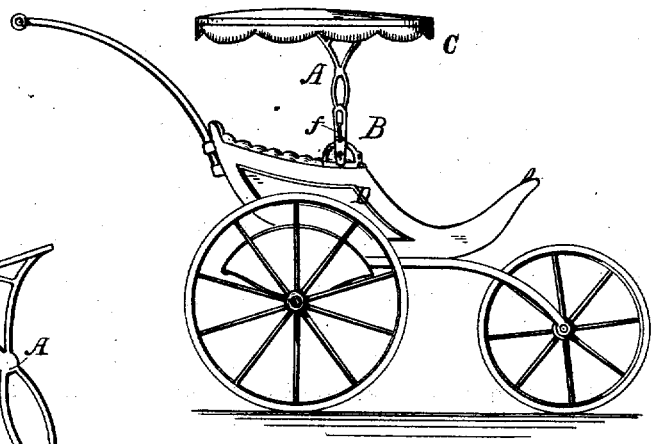
Figure 3:
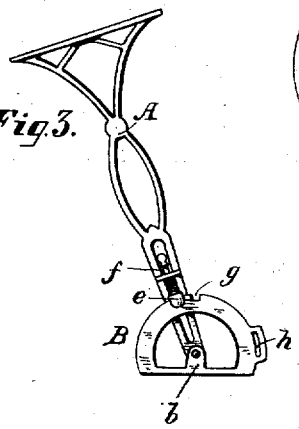
Figure 2:
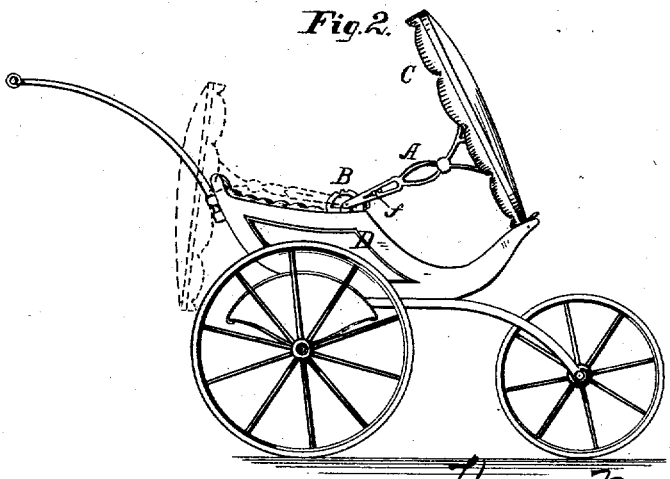

Figure 1 of the accompanying drawings is a side elevation of my improvement with the top shown in an upright position. Fig. 2 is a like view with the top shown dropped forward, its position when thrown back being represented by dotted lines. Fig. 3 is an enlarged view of one of the rigid arms by which the canopy is supported and one of the arcs upon which it is adjustable, both being shown detached.

At each side of the body D of the carriage, and at or near the front end of the seat, I attach one of the arcs B B. The arms A A are jointed at their lower extremities at the center of the arcs to the projection *b*, Fig. 3, and are secured rigidly to the top C, at a slight distance from the center, as shown in Figs. 1 and 2.

The arms A A may be made of any ornamental form, preferably of light open-work, as seen in Fig. 3, and of metal or other suitable material. They are jointed at one side of the arcs, as seen in Fig. 3, and their opposite sides are provided each with a lug, *e*, which embraces the arc and prevents any lateral motion of the arms, but leaves them free to traverse the arcs in either direction, front or back, so that the top C may be lowered in front of the seat, as seen in Fig. 2, arranged in an upright position, as in Fig. 1, or thrown back between the handles, as shown by the dotted lines in Fig. 2, or placed in any intermediate position, as occasion may require. The arms are each provided with a spring-bolt, *f*, Fig. 3, or other equivalent fastening, which engages with the recess *g* on the arcs when the canopy is placed in an upright position, as in Fig. 1, securing it until the bolts are withdrawn by the hand. The arcs may be provided with a series of such recesses, so that the top may be retained at any desired angle. At one end of the arcs is a slot, *h*, Fig. 3, through which the guard-strap may be passed and secured.

The advantages attained by having the top so constructed as to be capable of being lowered in front of the seat, or inclined at various angles, as well as being placed upright or thrown back, are numerous and important. By this means the child can be effectually protected from the rays of the sun in front, as well from above and behind, and also from cold or strong winds, or from dust; and, moreover, the nurse or person driving the carriage from behind will be enabled to watch the child constantly, speak to it, and attend to many of its requirements without leaving her position in the rear.

A top or canopy constructed in accordance with my improvements may also be applied to other than children's carriages, if found desirable.

I claim as my invention—

1. In a child's carriage, a rigid top or canopy, C, fixed upon the arms A, pivoted to the sides of the body, so that said canopy may drop in front of the seat or behind it, or be held in an upright or intermediate position, substantially as and for the purposes set forth.

2. The combination of the arms A, having the spring-bolt *f*, and pivoted upon the arc-shaped irons B, with the top C, and applied to the body D, substantially as herein shown and described, for the purpose specified.

In testimony whereof I have hereunto signed my name this 14th day of June, A. D. 1883.

HENRY M. RICHARDSON.

In presence of—
JEROME H. FISKE,
EDGAR H. BULLARD.